(12) United States Patent
Yoo et al.

(10) Patent No.: US 7,659,961 B2
(45) Date of Patent: Feb. 9, 2010

(54) THIN FILM TRANSISTOR SUBSTRATE CAPABLE OF ENHANCING IMAGE CLARITY AND REDUCING RESIDUAL IMAGES

(75) Inventors: Seung Hoo Yoo, Seongnam-Si (KR); Sung Min Kang, Seoul (KR); Hee Wook Do, Cheonan-Si (KR); Hoon Kim, Ansan-Si (KR); Hyun Cheol Moon, Suwon-Si (KR); Hye Ran You, Yongin-Si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 143 days.

(21) Appl. No.: 11/968,533

(22) Filed: Jan. 2, 2008

(65) Prior Publication Data

US 2008/0158455 A1    Jul. 3, 2008

(30) Foreign Application Priority Data

Jan. 3, 2007    (KR)    ...................... 10-2007-0000782

(51) Int. Cl.
  *G02F 1/1333*    (2006.01)
  *G02F 1/1343*    (2006.01)
(52) U.S. Cl. .................... 349/158; 349/144; 349/146; 349/38
(58) Field of Classification Search ................ 349/158, 349/144, 146, 38, 39, 48, 130, 187
  See application file for complete search history.

(56) References Cited

U.S. PATENT DOCUMENTS

| 7,440,040 B2* | 10/2008 | Kwak et al. ................... 349/39 |
| 7,586,574 B2* | 9/2009 | Taguchi ...................... 349/144 |
| 2003/0218703 A1 | 11/2003 | Huh et al. |
| 2005/0134779 A1 | 6/2005 | Park et al. |
| 2006/0023151 A1* | 2/2006 | Lee et al. .................... 349/141 |
| 2006/0215066 A1* | 9/2006 | Ueda et al. ................... 349/38 |
| 2006/0244889 A1* | 11/2006 | Sohn et al. .................. 349/143 |
| 2007/0030407 A1* | 2/2007 | Kwak et al. ................... 349/38 |
| 2007/0159571 A1* | 7/2007 | Yang ........................... 349/54 |

FOREIGN PATENT DOCUMENTS

| JP | 2004-145266 | 5/2004 |
| JP | 2004-258598 | 9/2004 |
| JP | 2005-018079 | 1/2005 |
| JP | 2006-091064 | 4/2006 |
| JP | 2006-119539 | 5/2006 |
| JP | 2006-189774 | 7/2006 |
| KR | 1020010104069 | 11/2001 |
| KR | 1020030087682 | 11/2003 |
| KR | 1020050034114 | 4/2005 |
| KR | 1020050098631 | 10/2005 |
| KR | 1020060016504 | 2/2006 |
| KR | 1020060018121 | 2/2006 |
| KR | 1020060047023 | 5/2006 |
| KR | 1020060088192 | 8/2006 |

* cited by examiner

*Primary Examiner*—Mike Qi
(74) *Attorney, Agent, or Firm*—Innovation Counsel LLP

(57) ABSTRACT

A thin film transistor substrate and a liquid crystal display capable of eliminating residual images and enhancing clarity are presented. The thin film transistor substrate includes a charge-up capacitor for increasing electric charge in a first pixel electrode of a first pixel capacitor and a charge-down capacitor decreasing electric charge in a second pixel electrode of a second pixel capacitor. An extension electrode portion of the charge-up capacitor is formed in the shape of a frame to reduce any variation in the overlapping area between the first pixel electrode and the extension electrode portion caused by an alignment error generated during the manufacturing process.

12 Claims, 14 Drawing Sheets

THIN FILM TRANSISTOR SUBSTRATE CAPABLE OF ENHANCING IMAGE CLARITY AND REDUCING RESIDUAL IMAGES

CROSS-REFERENCE TO RELATED PATENT APPLICATION

This application claims priority to Korean Patent Application No. 2007-0000782 filed on Jan. 3, 2007 in the Korean Intellectual Property Office, the disclosure of which is incorporated by reference herein.

BACKGROUND OF THE INVENTION

1. Field of Invention

The present invention relates to a thin film transistor substrate and a display having the same, and more particularly to a liquid crystal display in which residual images can be eliminated and visibility can be enhanced using electric charge sharing between a plurality of sub-pixels.

2. Description of Related Art

Since a liquid crystal display (LCD) has advantages of small size, lightweight and a large-sized screen compared to a cathode ray tube (CRT), which has long been a conventional display, research in development of the LCD has been actively conducted.

An LCD displays images using a plurality of unit pixels, each of which has a thin film transistor (TFT) and a pixel capacitor.

The pixel capacitor comprises a pair of common electrodes and liquid crystals interposed therebetween. The LCD provides external electric charges to the pixel electrode through the TFT, thereby changing the electric field between the pixel and common electrodes. The movement of liquid crystal molecules is changed due to the change in the electric field. Accordingly, the amount of light transmitted through the liquid crystal molecules also changes and the desired images are displayed.

LCDs are not without problems. For example, the specific characteristics of liquid crystals cause low clarity and occurrence of residual images.

To address the above problems, research is being actively conducted to enhance the clarity and eliminate residual images by dividing a unit pixel of an LCD into two sub-pixels and allowing different electric charges to be applied to each of the sub-pixels.

SUMMARY OF THE INVENTION

In one aspect, the invention provides a thin film transistor (TFT) substrate and a display having the TFT substrate wherein charge-up and charge-down capacitors are provided in a unit pixel divided into a plurality of sub-pixels. Electric charges on the respective sub-pixels are made different from each other through the charge-up and charge-down capacitors, enhancing the clarity of the displayed images and eliminating residual images. Furthermore, any change in the capacitances of the charge-up and charge-down capacitors, which is caused by a process variation during the manufacture of the charge-up and charge-down capacitors, can be minimized.

The invention includes a TFT substrate that has: a plurality of gate lines and a plurality of data lines intersecting the plurality of gate lines; first and second pixel electrodes provided in a unit pixel region defined by the gate and data lines; a storage electrode partially overlapping the first and second pixel electrodes; an overlapping electrode portion at least partially overlapping the storage electrode portion; an extension electrode portion including at least one electrode overlapping region overlapping the first pixel electrode and at least one electrode connection region for connecting the electrode overlapping region and the overlapping electrode portion; first and second TFTs having source terminals connected to the data line and drain terminals respectively connected to the first and second pixel electrode; and a third TFT having a source terminal connected to the second pixel electrode and a drain terminal connected to the overlapping electrode portion.

The invention also includes a TFT substrate that has: a plurality of gate lines and a plurality of data lines intersecting the plurality of gate lines; first and second pixel electrodes provided in a unit pixel region defined by the gate and data lines; a storage electrode partially overlapping the first and second pixel electrodes; an overlapping electrode portion at least partially overlapping the storage electrode portion; an extension electrode portion connected to the overlapping electrode portion and partially overlapping the first pixel electrode; first and second TFTs having source terminals connected to the data line and drain terminals respectively connected to the first and second pixel electrode; a third TFT having a source terminal connected to the second pixel electrode and a drain terminal connected to the overlapping electrode portion; and at least one cut-away region provided in a region of the first pixel electrode overlapping the extension electrode portion.

In another aspect, the invention is a display including: a main pixel and a sub-pixel respectively having a main capacitor and sub-capacitor; a charge-down capacitor decreasing electric charge in the sub-capacitor; a connection TFT for connecting the sub-capacitor and the charge-down capacitor in parallel in accordance with a gate turn-on signal; and a charge-up capacitor increasing electric charge in the main capacitor, wherein the charge-up capacitor has a first electrode connected to a connection node between the sub-capacitor and the charge-down capacitor and a second electrode connected to the main capacitor, the first electrode having an overlapping region overlapping the second electrode and a connection region connected to the connection node.

The invention also includes a display having: a plurality of gate lines sequentially supplied with a gate turn-on voltage; a plurality of data lines supplied with gray level signals; a first pixel capacitor having a first pixel electrode and a common electrode; a second pixel capacitor having a second pixel electrode and the common electrode; first and second TFTs driven in accordance with a gate line signal to provide the gray level signals of the data lines to the first and second pixel electrodes, respectively; a charge-down capacitor having a storage electrode portion and an overlapping electrode portion; a charge-up capacitor having an extension electrode portion connected to the overlapping electrode portion and the first pixel electrode; and a third TFT driven in accordance with another gate line signal to provide a signal of the second pixel electrode to the overlapping electrode portion, wherein the extension electrode portion includes at least one electrode overlapping region overlapping the first pixel electrode and at least one electrode connection region connecting the electrode overlapping region to the overlapping electrode portion.

In yet another aspect, the invention provides a method of manufacturing a TFT substrate including: forming first and second gate lines, a storage electrode portion, first and second gate terminals connected to the first gate line, and a third gate terminal connected to the second gate line on a substrate; forming a gate insulation film on top of the substrate; forming first and second active layers on top of the first and second gate terminals and forming a third active layer on top of the third gate terminal; forming a data line intersecting the first and second gate lines, an overlapping electrode portion partially overlapping the storage electrode portion, and a frame-shaped extension electrode portion connected to the overlapping electrode portion on top of the substrate, forming a first drain terminal and a first source terminal connected to the data line on top of the first active layer, forming a second drain terminal and a second source terminal connected to the data line on top of the second active layer, and forming a third source terminal and a third drain terminal connected to the overlapping electrode portion on top of the third active layer; forming a protection film covering the first and second gate lines, the storage electrode portion, the first and second gate terminals, the first, second, and third active layers, the data line, the frame-shaped extension electrode portion, and the first, second, and third source terminals; removing a portion of the protection film to form first and second pixel contact holes respectively extending to portions of the first and second drain terminals and a third pixel contact hole exposing a portion of the third source terminal; and forming a first pixel electrode connected to the first drain terminal through the first pixel contact hole and partially overlapping the extension electrode portion, and a second pixel electrode connected to the second drain terminal and the third source terminal respectively through the second pixel contact hole and the third pixel contact hole on the protection film.

BRIEF DESCRIPTION OF THE DRAWINGS

Exemplary embodiment of the invention can be understood in more detail form the following description in conjunction with the accompanying drawings, in which.

DETAILED DESCRIPTION OF THE EMBODIMENT(S)

Figure 1:
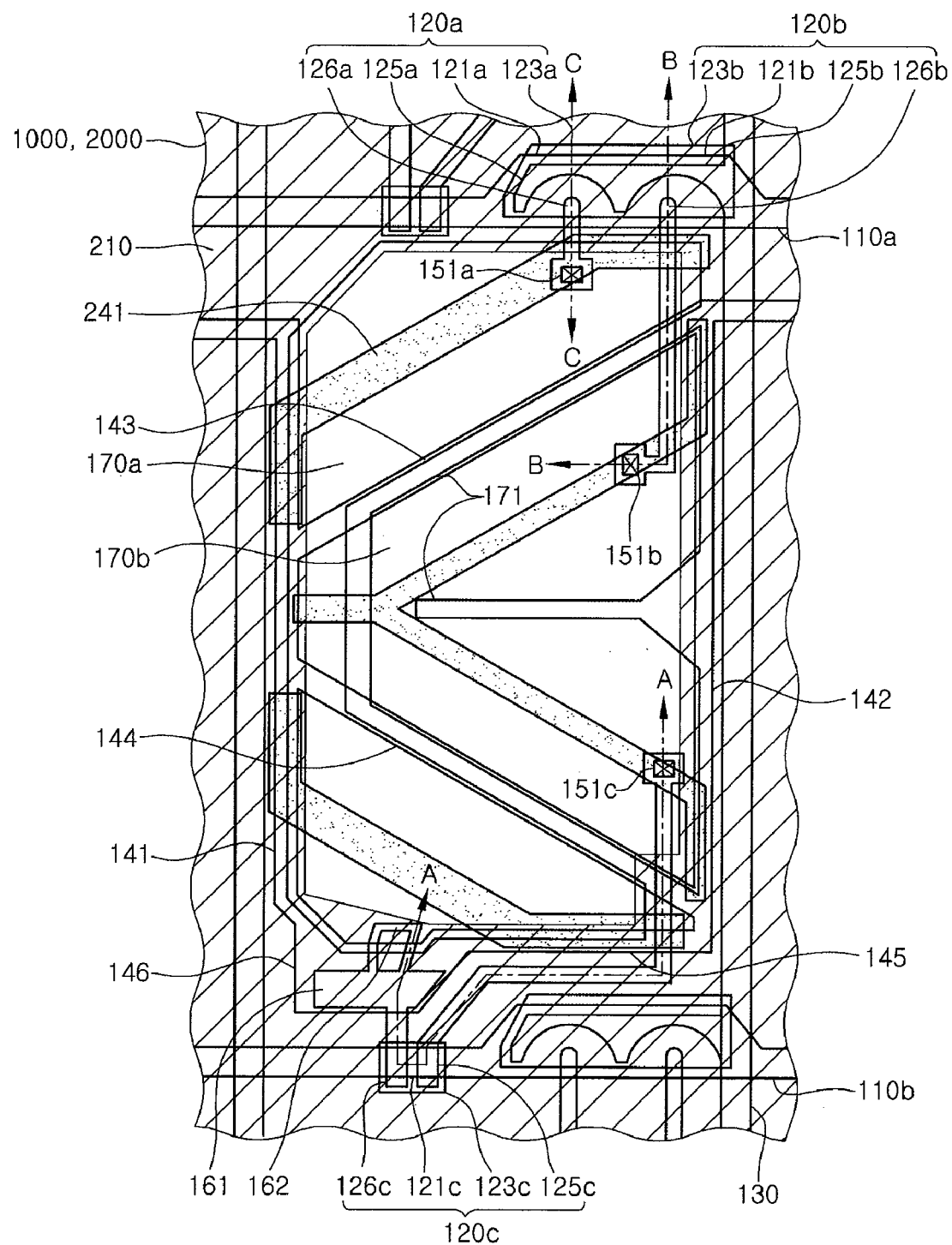
FIG. 1 is a plan view conceptually showing a display according to a first exemplary embodiment of the present invention.

Hereinafter, exemplary embodiments of the present invention will be described in detail with reference to the accompanying drawings. However, the present invention is not limited to the exemplary embodiments disclosed below and may be implemented in different forms. These exemplary embodiments are provided only for illustrative purposes and for full understanding of the scope of the present invention by those skilled in the art. In the drawings, the size and relative sizes of layers and regions may be exaggerated for clarity.

It will be understood that when an element or layer is referred to as being "on" or "connected to" another element or layer, the element or layer can be directly on or connected to another element or layer or intervening elements or layers. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "below", "lower", "above", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular exemplary embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments of the invention are described herein with reference to cross-sectional illustrations that are schematic illustrations of idealized exemplary embodiments (and intermediate structures) of the invention. As such, variations from the shapes of the illustrations as a result, for example, of manufacturing techniques and/or tolerances, are to be expected. Thus, exemplary embodiments of the invention should not be construed as limited to the particular shapes of regions illustrated herein but are to include deviations in shapes that result, for example, from manufacturing.

For example, an implanted region illustrated as a rectangle will typically have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be described in detail with reference to the accompanying drawings.

Figure 2:
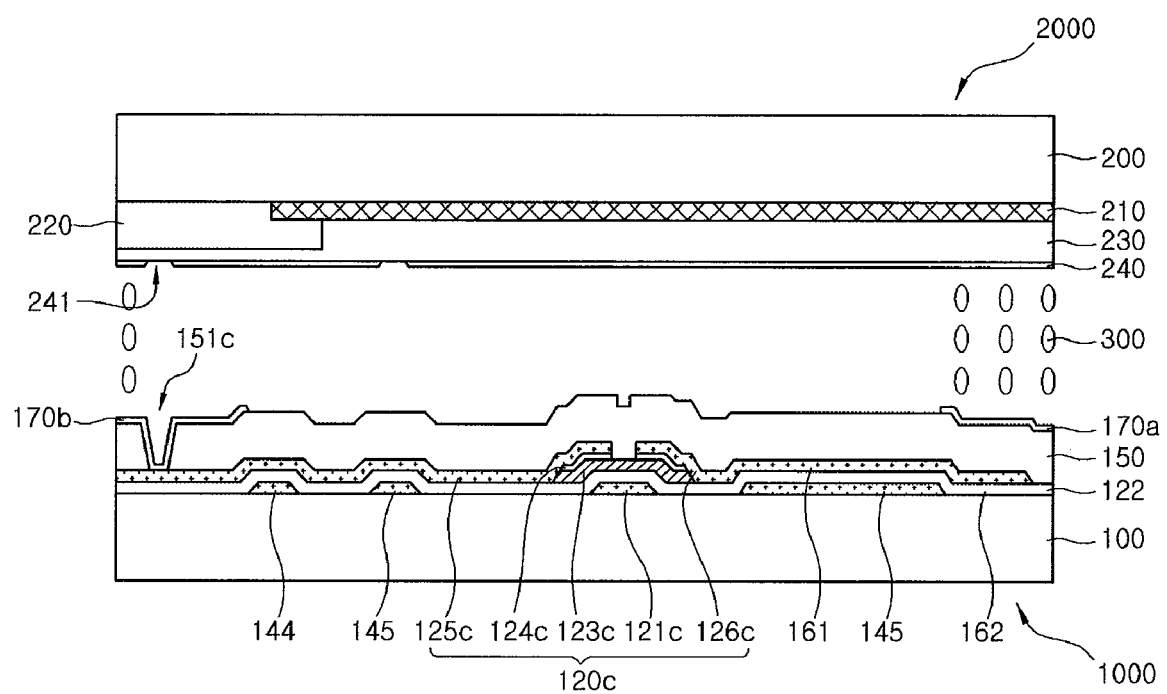
FIG. 2 is a sectional view taken along line A-A in FIG. 1.
Figure 3:
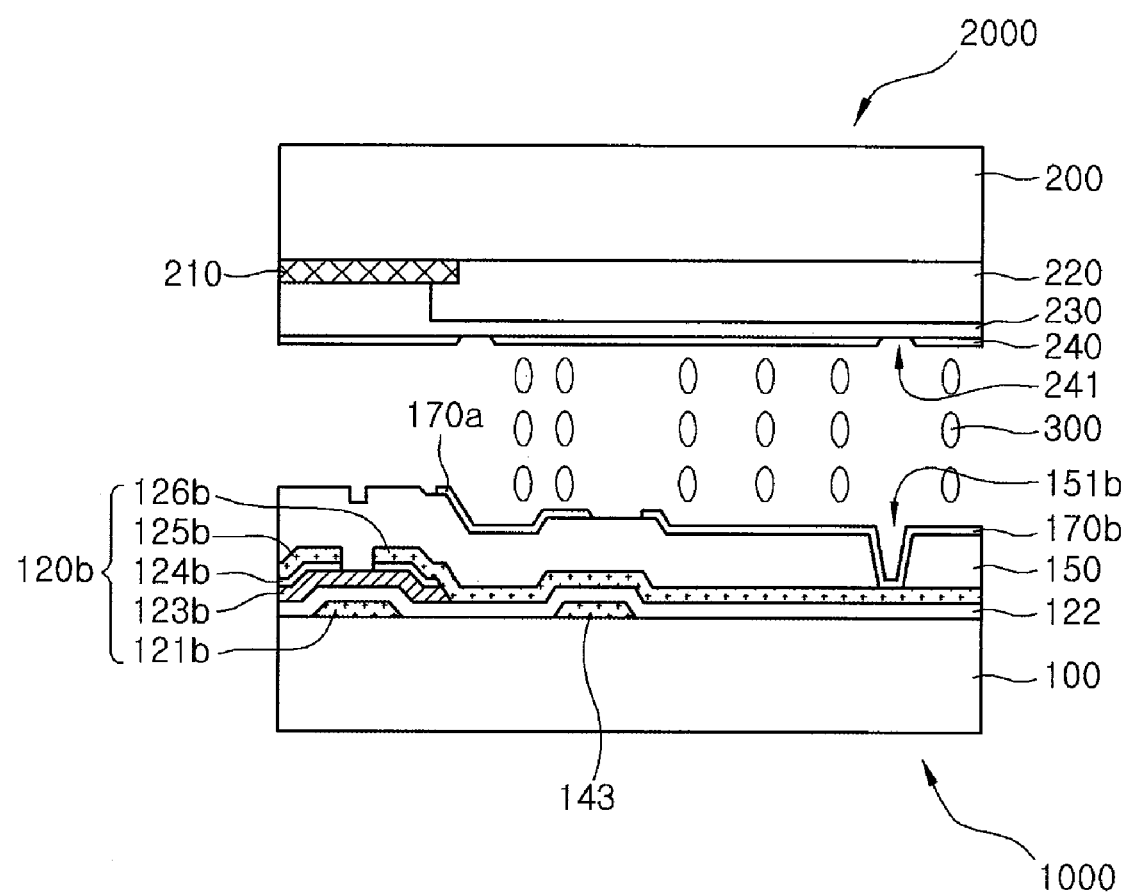
FIG. 3 is a sectional view taken along line B-B in FIG. 1.
Figure 4:
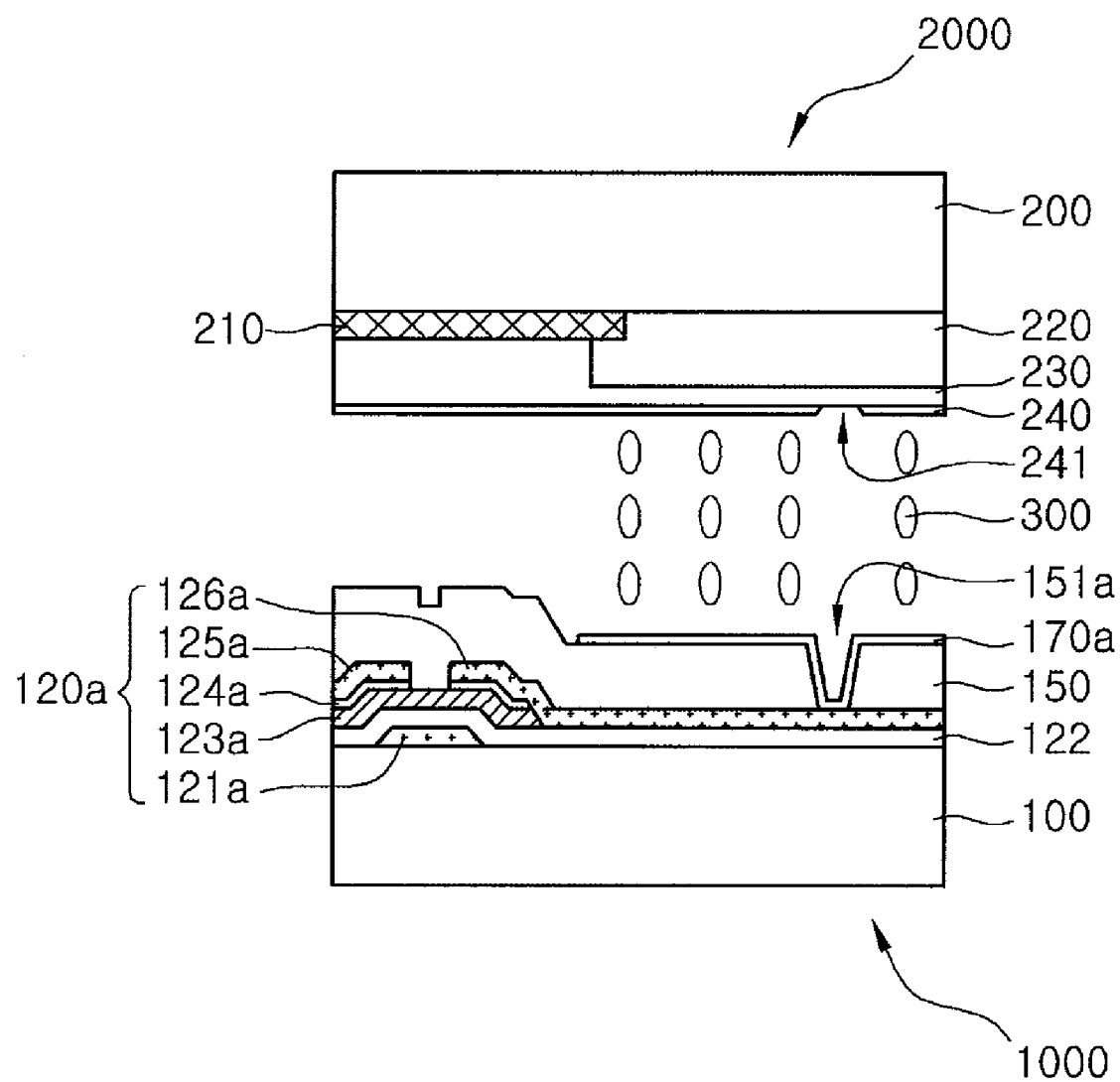
FIG. 4 is a sectional view taken along line C-C in FIG. 1.
Figure 5:
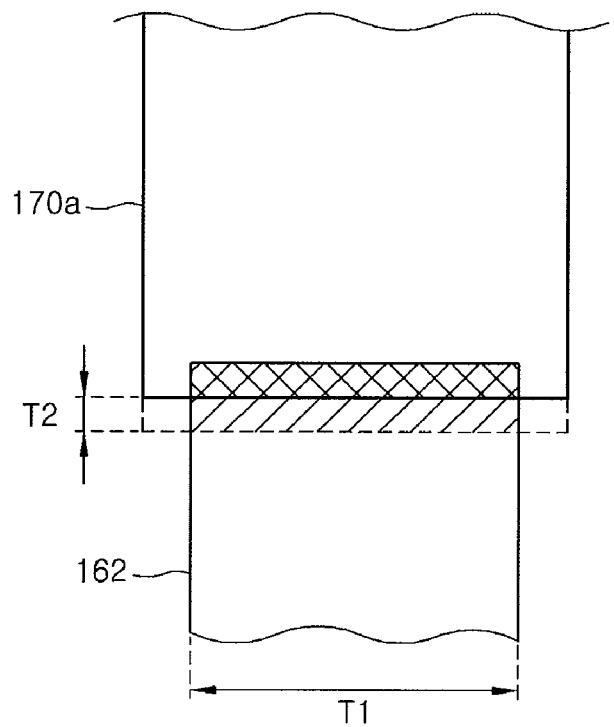
FIGS. 5 and 6 are views conceptually illustrating a change in capacitance of a charge-up capacitor according to the first exemplary embodiment of the present invention.
Figure 6:
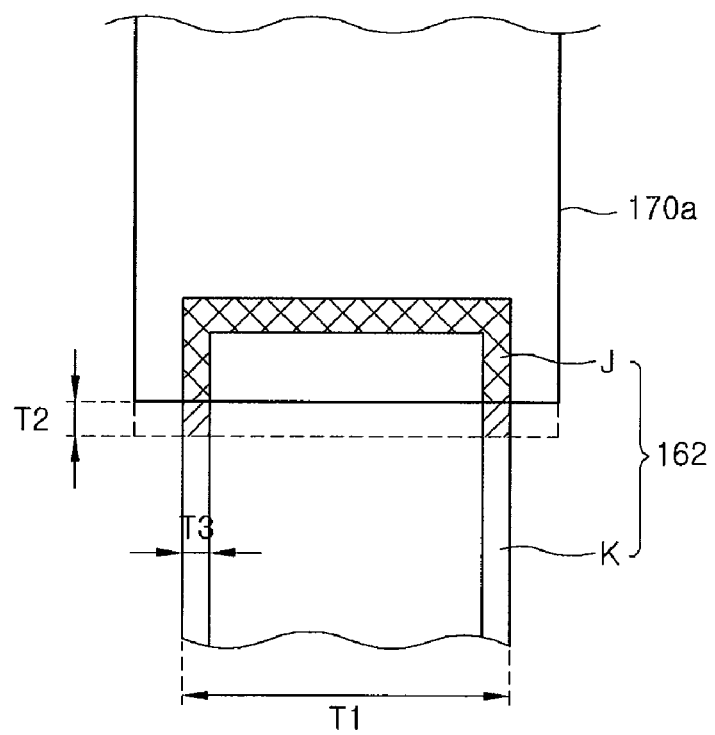
Figure 7:
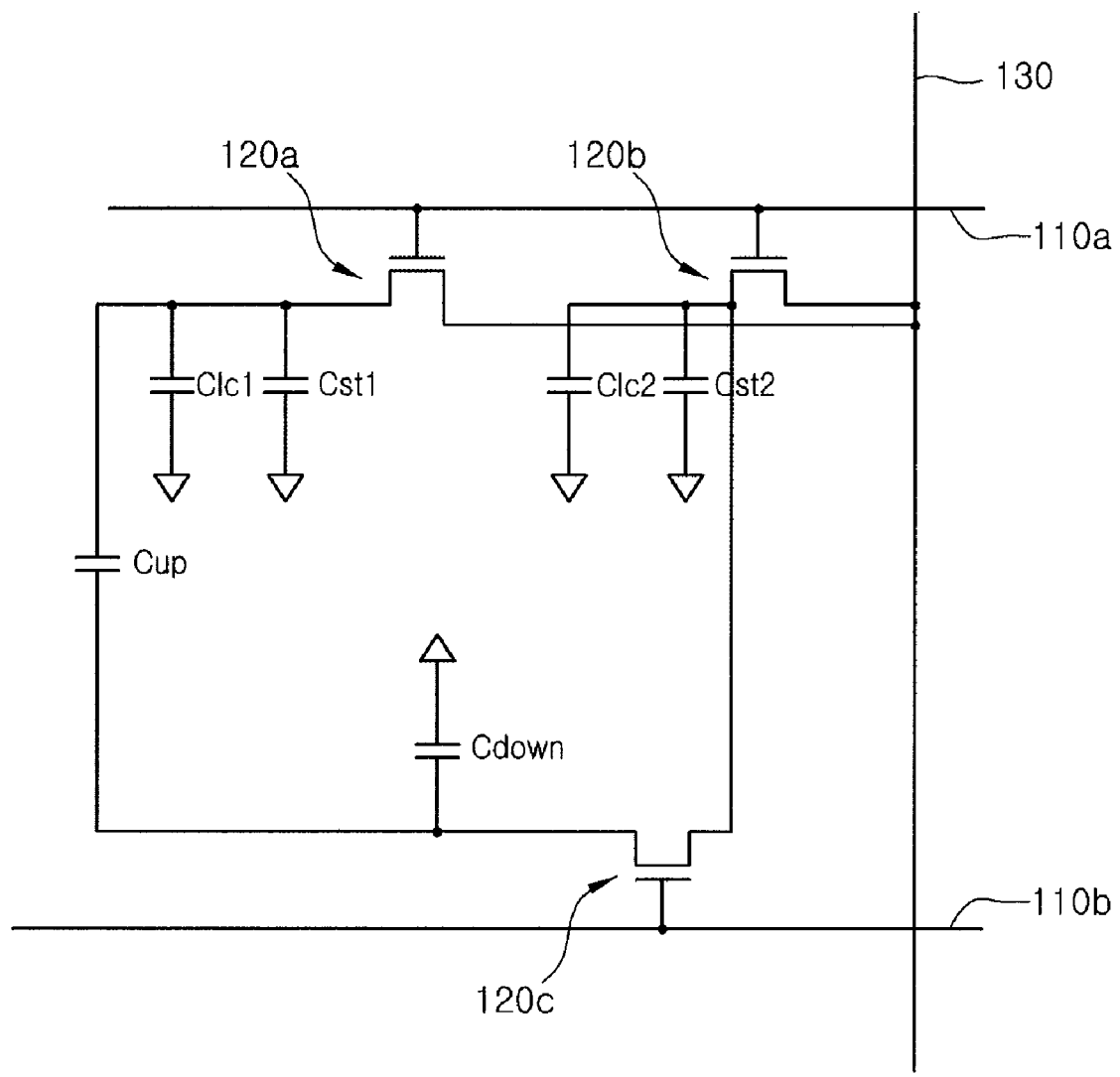
FIG. 7 is a circuit diagram of a unit pixel of the display according to the first exemplary embodiment of the present invention.

FIG. 1 is a plan view conceptually showing a display according to a first exemplary embodiment of the present invention, FIG. 2 is a sectional view taken along line A-A in FIG. 1, FIG. 3 is a sectional view taken along line B-B in FIG. 1, and FIG. 4 is a sectional view taken along line C-C in FIG. 1. FIGS. 5 and 6 are views conceptually illustrating a change in capacitance of a charge-up capacitor according to the first exemplary embodiment of the present invention. FIG. 7 is a circuit diagram of a unit pixel of the display according to the first exemplary embodiment of the present invention.

Referring to FIGS. 1 to 7, the display according to this exemplary embodiment has a thin film transistor (TFT) substrate 1000 that is shown as a lower substrate, a common electrode substrate 2000 that is shown as an upper substrate, and liquid crystals 300 interposed between the upper and lower substrates 1000, 2000. An orientation film (not shown) for orienting the liquid crystals 300 is provided on a surface of each of the upper and lower substrates to align liquid crystal molecules. At this time, it is preferred that the orientation of the molecules of the liquid crystals 300 be a vertical orientation mode which causes the orientation to be vertical to each of the substrates. However, since the orientation need not be vertical, the present invention is not specifically limited to any particular orientation.

The TFT substrate 1000 has a plurality of gate lines 110 (110*a* and 110*b*) provided on a transparent insulative substrate 100, a plurality of data lines 130 formed perpendicularly to the plurality of gate lines 110, first and second pixel electrodes 170*a* and 170*b* formed in a unit pixel region defined by the plurality of gate and data lines 110 and 130, first and second TFTs 120*a* and 120*b* provided in the unit pixel region, and a storage electrode portion 140 (141, 142, 143, 144, 145 and 146) partially overlapping the first and second pixel electrodes 170*a* and 170*b*. The TFT substrate 1000 further comprises an overlapping electrode portion 161 at least partially overlapping the storage electrode portion 140, an extension electrode portion 162 partially overlapping the first pixel electrode 170*a*, and a third TFT 120*c* having a third source terminal 125*c* connected to the second pixel electrode 170*b* and a third drain terminal 126*c* connected to the overlapping electrode portion 161 and the extension electrode portion 162.

The unit pixel region is defined by two of the gate lines 110 and two of the data lines 130. The first and second TFTs 120*a* and 120*b* in the unit pixel region are connected to a first gate line 110*a* and one data line 130, respectively. The third TFT 120*c* is connected to a second gate line 110*b*.

A first gate terminal 121*a* of the first TFT 120*a* is connected to the first gate line 110*a*, a first source terminal 125*a* is connected to the one data line 130, and a first drain terminal 126*a* is connected to the first pixel electrode 170*a*. A second gate terminal 121*b* of the second TFT 120*b* is connected to the first gate line 110*a*, a second source terminal 125*b* is connected to the one data line 130, and a second drain terminal 126*b* is connected to the second pixel electrode 170*b*. A third gate terminal 121*c* of the third TFT 120*c* is connected to the second gate line 110*b*, a third source terminal 125*c* is connected to the second pixel electrode 170*b*, and a third drain terminal 126*c* is connected to the overlapping electrode portion 161.

The plurality of gate lines 110 mainly extend in a first direction, and the gate lines 110 partially protrude to form the first to third gate terminals 121*a*, 121*b* and 121*c* of the first to third TFTs 120*a*, 120*b* and 120*c*, respectively. Gate contact pads (not shown) for connection with an external circuit are formed at ends of the plurality of the gate lines 110, respectively. Each of the gate lines 110 may be formed to have a single-layered structure or a multiple-layered structure with two or more layers. In a case where the gate line 110 has a structure having two or more layers, it is preferred that one layer be formed of a material with a low resistance and another layer be formed of a material with a superior contact property with other materials. For example, a double-layered structure of Cr/Al (or Al alloy) or Al (or Al alloy)/Mo may be used. However, this is not a limitation and the gate line 110 may be formed of various metals or conduction materials.

The plurality of data lines 130 mainly extend in a second direction that is perpendicular to the first direction, and the data lines 130 partially protrude to form the first and second source terminals 125*a* and 125*b* of the first and second TFTs 120*a* and 120*b*. Data contact pads (not shown) are formed at ends of the plurality of data lines 130, respectively. Each of the data lines 130 may also be formed to have a single-layered structure or a multiple-layered structure with two or more layers that have different material properties. In a case where the data line 130 has two or more layers, it is preferred that one layer be formed of a material with low resistance for reducing data signal delay and voltage drop, and another layer be formed of a material with a superior contact property with other materials. Although the data line 130 is shown to be straight in FIG. 1, the data line 130 may have a predetermined bend region in some embodiments. In a case where the data line 130 has a bent region, the first and second pixel electrodes 170*a* and 170*b* may be formed along the bent region of the data line 130.

The storage electrode portion 140 comprises first to fifth storage lines 141, 142, 143, 144 and 145 that partially overlap the first and second pixel electrodes 170*a* and 170*b*, and a storage electrode overlapping portion 146 that partially overlap the overlapping electrode portion 161.

The first storage line 141 extends parallel to the data lines 130 and partially overlaps the first pixel electrode 170*a*. The second storage line 142 extends parallel to the data lines 130 and partially overlaps the second pixel electrode 170*b*. The third and fourth storage lines 143 and 144 are respectively provided in regions between the first and second pixel electrodes 170*a* and 170*b* to connect the first and second storage lines 141 and 142. The storage electrode overlapping portion 146 is partially connected to the first storage line 141. The fifth storage line 145 connects the storage electrode overlapping portion 146 and the second storage line 142. In the aforementioned description, the storage electrode portion 140 having the five storage lines 141, 142, 143, 144 and 145 and the storage electrode overlapping portion 146 has been described. However, the present invention is not limited to these embodiments and may have more storage lines and storage electrode overlapping portions, or fewer storage lines. The storage electrode portion 140 is formed of the same material as the gate line 110. Preferably, the storage electrode portion 140 is patterned simultaneously with the gate lines 110. Further, it is preferred that ends of the storage lines 141, 142, 143, 144 and 145 receive a common voltage Vcom. Here, a first storage capacitor Cst1 is provided at a region in which the storage electrode portion 140 and the first pixel electrode 170a overlap each other. That is, the storage electrode portion 140 and the first pixel electrode 170a are used as electrode terminals of the first storage capacitor Cst1, and an insulation film between the storage electrode portion 140 and the first pixel electrode 170a is used as the dielectric. A second storage capacitor Cst2 is provided at a region in which the storage electrode portion 140 and the second pixel electrode 170b overlap each other. That is, the storage electrode portion 140 and the second pixel electrode 170b are used as electrode terminals of the second storage capacitor Cst2, and an insulation film between the storage electrode portion 140 and the second pixel electrode 170b is used as the dielectric.

The first pixel electrode 170a comprises an upper plate portion positioned over the unit pixel region, a lower plate portion positioned under the unit pixel region, and a connection portion for connecting the upper and lower plate portions. The upper plate portion is formed in the shape of a plate extending from a right upper end to a left central region of the unit pixel region. The lower plate portion is manufactured in the shape of a plate extending from a right lower end to a left central region of the unit pixel region. Accordingly, the first pixel electrode 170a is formed in a general "V" shape as shown in FIG. 1. The lower plate portion has a protrusion region partially overlapping the extension electrode portion 162. Preferably, each of the upper and lower plate portions is inclined at an angle of about 45 degrees with respect to the gate line 110. Of course, the angle is not limited thereto but may be various.

The second pixel electrode 170b is formed in the shape of a plate between the upper and lower plate portions of the first pixel electrode 170a. A cut-away portion is provided at the center of the second pixel electrode 170b. The cut-away portion extends from a right central region to a left central region of the unit pixel regions. The second pixel electrode 170b is substantially symmetric with respect to a line equally dividing the unit pixel region into upper and lower parts. As shown in FIG. 1, the second pixel electrode 170b is formed in a general "V" shape.

The first and second pixel electrodes 170a and 170b are spaced apart from each other by cut-away patterns 171. The cut-away patterns 171 are used as a domain regulating means for controlling the orientation direction of the liquid crystals. It will be apparent that various domain regulating means may be used in addition to the cut-away patterns. The first and second pixel electrodes 170a and 170b are used as one electrode terminal of the first and second pixel capacitors Clc1 and Clc2, respectively.

The first to third TFTs 120a, 120b and 120c further comprise a gate insulation film 122 formed on the first to third gate terminals 121a, 121b, and 121c, and first to third active layers 123a, 123b, and 123c and first to third ohmic contact layers 124a, 124b and 124c, which are formed on the gate insulation film 122. As shown in FIG. 1, the first and second gate terminals 121a and 121b are formed as a single body in the shape of a plate extending from the first gate line 110a. As shown in FIG. 1, the third gate terminal 121c is formed to have the same size as the second gate line 110b. Of course, the third gate terminal 121c is not limited thereto but may be formed in the shape of a plate, which protrudes from a portion of the second gate line 110. The gate insulation film 122 is formed on the first to third gate terminals 121a, 121b and 121c.

The first and second active layers 123a and 123b are formed on top of the first and second gate terminals 121a and 121b, respectively. The first and second source terminals 125a and 125b are formed on top of the first and second active layers 123a and 123b. First and second lowered portions are provided inside the body for the first and second source terminals 125a and 125b. The first drain terminal 126a extends from an inner region of the first concave portion to partially overlap the first pixel electrode 170a. The second drain terminal 126b extends from an inner region of the second concave portion to partially overlap the second pixel electrode 170b. The lowered region between the first source and drain terminals 125a and 126a serves as a channel region of the first TFT 120a. The lowered region between the second source and drain terminals 125b and 126b serves as a channel region of the second TFT 120b. The first drain terminal 126a is electrically connected to the first pixel electrode 170a through a first pixel contact hole 151a. The second drain terminal 126b is electrically connected to the second pixel electrode 170b through a second pixel contact hole 151b. As described above, the first and second gate terminals 121a and 121b are formed, so that the first and second TFTs 120a and 120b can be simultaneously driven. Further, the first and second source terminals 125a and 125b and the first and second active layers 123a and 123b are formed, respectively, so that a data signal supplied through one of the data lines 130 can be simultaneously provided to the first and second pixel electrodes 170a and 170b electrically isolated from each other.

The third active layer 123c is formed on top of the third gate terminal 121c. The third source terminal 125c extends from an edge of the third active layer 123c and partially overlaps the second pixel electrode 170b. The third source terminal 125c is electrically connected to the second pixel electrode 170b through a third pixel contact hole 151c. The third drain terminal 126c extends from the other edge of the third active layer 123c to be connected to the overlapping electrode portion 161.

As shown in FIG. 1, the overlapping electrode portion 161 is formed in the shape of a plate provided on top of the storage electrode portion 146 of the storage electrode portion 140. It will be apparent that a portion of the overlapping electrode portion 160 in the shape of a plate may be provided on top of the storage electrode portion 140. The overlapping electrode portion 161 may be formed in the shape of a polygonal, circular or elliptical plate. A charge-down capacitor Cdown is provided in a region in which the overlapping electrode portion 161 and the storage electrode portion 140 overlap each other. The charge-down capacitor Cdown serves to decrease an electric charge on the second pixel capacitor Clc2. That is, the storage electrode portion 140 and the overlapping electrode portion 161 are used as electrode terminals of the charge-down capacitor Cdown, and an insulation film between the storage electrode portion 140 and the overlapping electrode portion 161 is used as the dielectric. The capacitance of the charge-down capacitor Cdown may vary depending on the size of the overlapping area between the overlapping electrode portion 161 and the storage electrode portion 140. More specifically, the capacitance is in proportion to the overlapping area between the storage electrode portion 140 and the overlapping electrode portion 161. Thus, the capacitance of the charge-down capacitor Cdown is determined by setting the overlapping area between the storage electrode portion 140 and the overlapping electrode portion 161 in an initial design stage. As described above, the overlapping electrode portion 161 is provided on top of the storage electrode overlapping portion 146 of the storage electrode portion 140. The storage electrode overlapping portion 146 is formed to have an area larger than that of the overlapping electrode portion 161. Accordingly, even if an alignment error occurs during the process of manufacturing the overlapping electrode portion 161, the overlapping electrode portion 161 can be positioned on top of the storage electrode overlapping portion 146. This prevents an initially set overlapping area from being missed due to an alignment error generated during the manufacturing process.

The extension electrode portion 162 comprises at least one electrode overlapping region J overlapping the first pixel electrode 170a, and at least one electrode connection region K connecting the electrode overlapping region J and the overlapping electrode portion 161. Preferably, a portion of the electrode connection region K overlaps the first pixel electrode 170a. A charge-up capacitor Cup is provided at a region in which the extension electrode portion 162 and the first pixel electrode 170a overlap each other. The charge-up capacitor Cup serves to increase the electric charge on the first pixel capacitor Clc1. The first pixel electrode 170a and the extension electrode portion 162 are used as electrode terminals of the charge-up capacitor Cup, and an insulation film between the extension electrode portion 162 and the first pixel electrode 170a is used as the dielectric. The capacitance of the charge-up capacitor Cup may vary depending on an overlapping area between the extension electrode portion 162 and the first pixel electrode 170a. The capacitance of the charge-up capacitor Cup is determined by setting the overlapping area between the first pixel electrode 170a and the extension electrode portion 162 in an initial design stage.

In this exemplary embodiment, the electrode overlapping and electrode connection regions J and K of the extension electrode portion 162 are formed in the shape of a single frame, as shown in FIGS. 1 and 6. The first pixel electrode 170a is provided on the extension electrode portion 162. Accordingly, the electrode connection region K of the extension electrode portion 162 is formed in the shape of a frame, to minimize any change in the overlapping area between the extension electrode portion 162 and the first pixel electrode 170a that could be caused from an alignment error generated during the formation of the first pixel electrode 170a. To this end, cases where the extension electrode portion 162 is formed in the shape of a plate as shown in FIG. 5 and in the shape of a frame as shown in FIG. 6 will be described below by comparing such cases with each other.

Description will now be based on a case where the first pixel electrode 170a extends further by a length T2 shown in FIGS. 5 and 6 due to the alignment error generated when forming the first pixel electrode 170a. First, in a case where the extension electrode portion 162 is formed in the shape of a plate with a width of T1 as shown in FIG. 5, the increased value of the overlapping area between the first pixel electrode 170a and the extension electrode portion 162 due to the alignment error is T1×T2. In comparison, in a case where the extension electrode portion 162 is formed in the shape of a frame with an width T3 as shown in FIG. 6, the increased value of the overlapping area between the first pixel electrode 170a and the extension electrode portion 162 due to the alignment error is 2(T2×T3). For example, suppose that T1 is 10, T2 is 1, and T3 is 1. If the extension electrode portion 162 is formed in the shape of a plate as shown in FIG. 5, the increased value of the overlapping area due to the alignment error is 10. However, if the extension electrode portion 162 is formed in the shape of a frame as shown in FIG. 6, the increased value of the overlapping area due to the alignment error is 2. Accordingly, if the extension electrode portion 162 is formed in the shape of a frame, the change of the overlapping area due to the alignment error generated during the formation of the first pixel electrode 170a can be minimized.

The present invention is not limited to the embodiments described herein. More specifically, the electrode connection region K and the electrode overlapping region J of the extension electrode portion 162 may be formed in a frame shape and a plate shape, respectively. This is because the capacitance of the charge-up capacitor Cup is determined depending on the overlapping area between the extension electrode portion 162 and the first pixel electrode 170a. Thus, the electrode overlapping region J of the extension electrode portion 162 can be formed in the shape of a plate in order to maintain a sufficient capacitance. It is preferred that the electrode overlapping area J be provided in a lower end of the first pixel electrode 170a such that the electrode overlapping region J can always overlap the first pixel electrode 170a within the alignment error range. Further, although two electrode connection regions K are shown in FIGS. 1 and 6, this is e not a limitation of the invention and there may be more or fewer electrode connection regions K.

Here, assuming that the line width of the gate line 110 is 1, it is preferred that the width of the band is 0.1 to 1. If the width of the band is smaller than 0.1, the wiring resistance becomes too large. If the width of the band is larger than 1, the increased value of the overlapping area is greatly changed when the alignment error of the first pixel electrode 170a is generated. The band may be a ring shape, both ends of which are connected to the overlapping electrode portion 161, or a line shape, an end of which is connected to the overlapping electrode portion 161.

An insulative protection film 150 is formed on top of the aforementioned first to third TFTs 121a, 121b, and 121c and the data lines 130. The insulative protection film 150 may be made of an inorganic material, such as silicon nitride or silicon oxide, or an organic material with a low dielectric constant. It will be apparent that the insulative protection film 150 may be formed to have a double-layered structure of an inorganic insulation film and an organic film. The insulative protection film 150 is provided with the first to third pixel contact holes 151a, 151b and 151c, respectively extending to portions of the first and second drain terminals 126a and 126b and the third source terminal 125c. Further, the first and second pixel electrodes 170a and 170b are formed on the insulative protection film 150. The first pixel electrode 170a is connected to the first drain terminal 126a through the first pixel contact hole 151a. The second pixel electrode 170b is connected to the second drain terminal 126b and third source terminal 125c respectively through the first and second pixel contact holes 151b and 151c.

Further, in the common electrode substrate 2000, a black matrix 210 for preventing light leakage and light interference between adjacent pixel regions and red, green blue color filters 220 are formed on an insulative substrate 200. An overcoat film 230 made of an organic material is formed on the color filters 220. A common electrode 240 made of a transparent conductive material such as ITO or IZO is formed on the overcoat film 230. A plurality of cut-away patterns 241 are provided in the common electrode 240. In this exemplary embodiment, the plurality of cut-away patterns 241 are provided at a position where the first and second pixel electrodes 170a and 170b are divided from each other, as shown in FIG. 1. There may be provided protrusion patterns in place of the cut-away patterns 241. The cut-away patterns 171 of the first and second pixel electrode 170a and 170b and the cut-away patterns 241 of the common electrode 240 serve as a domain regulating means for divided orientations of the liquid crystal molecules. Such domain regulation means may be formed in at least any one region of the first and second pixel electrode 170a and 170b and the common electrode 240. The first and second pixel capacitors are provided between the first and second pixel electrodes 170a and 170b and the common electrode 240. At this time, the first pixel electrode 170a and the common electrode 240 are used as electrode terminals of the first pixel capacitor Clc1, and the liquid crystals 300 are used as the dielectric. The second pixel electrode 170b and the common electrode 240 are used as electrode terminals of the second pixel capacitor Clc2, and the liquid crystals 300 are used as the dielectric.

Accordingly, formed in the unit pixel region can be the unit pixel including first and second sub-pixels and an electric charge controller for controlling electric charge in the first and second sub-pixels. The first sub-pixel is a main pixel expressing a high gray level, and the second sub-pixel is a sub-pixel expressing a low gray level. Here, the first sub-pixel comprises the first TFT 120a, the first pixel capacitor Clc1 and the first storage capacitor Cst1. The second sub-pixel comprises the second TFT 120b, the second pixel capacitor Clc2 and the second storage capacitor Cst2. The electric charge controller comprises the third TFT 120c, the charge-down capacitor Cdown for decreasing the electric charge in the second pixel capacitor Clc2, and the charge-up capacitor Cup for increasing the electric charge in the first pixel capacitor Clc1.

The aforementioned TFT substrate 1000 and the common electrode substrate 2000 are bonded with the liquid crystals 300 interposed therebetween, so that there is provided a basic display panel of the display according to the exemplary embodiment of the present invention. In the display, components such as a polarizer, a backlight and an optical plate/sheet, which are not shown in the figures, may be arranged at both sides of such a basic panel.

Hereinafter, the operation of the display having the first and second sub-pixels and the electric charge controller in the unit pixel region as described above will be described with reference to the circuit diagram of FIG. 7.

A gate turn-on voltage is applied to the first gate line 110a. The first and second TFTs 120a and 120b connected to the first gate line 110a are turned on by the gate turn-on voltage applied to the first gate line 110a. The first and second pixel electrodes 170a and 170b of the first and second pixel capacitors Clc1 and Clc2 receive gray level signals through the data line 130 by the turned-on first and second TFTs 120a and 120b. Accordingly, the first and second pixel capacitors Clc1 and Clc2 are charged with the electric charge corresponding to the gray level signals.

The supply of the gate turn-on voltage applied to the first gate line 110a is cut off, and a gate turn-off voltage is applied to the first gate line 110a. Accordingly, the first and second TFTs 120a and 120b are turned off, and the first and second pixel capacitors Clc1 and Clc2 are maintained in a state where they are charged with the electric charge corresponding to the initial gray level signals.

Subsequently, a gate turn-on voltage is sequentially applied to the second gate line 110b. The third TFT 120c connected to the second gate line 110b is turned on by the gate turn-on voltage applied to the second gate line 110b.

A part of the electric charge on the second pixel electrode 170b of the second pixel capacitor Clc2 move to the overlapping electrode portion 161 of the charge-down capacitor Cdown and the extension electrode portion 162 of the charge-up capacitor Cup by the turned-on third TFT 120c. The part of the electric charge on the second pixel capacitor Clc2 escapes and moves to the charge-down capacitor Cdown. Thus, the electric charge on the second pixel capacitor Clc2 is decreased, and thus, only the electric charge corresponding to the low gray level signal remains in the second pixel capacitor Clc2. Accordingly, the second pixel capacitor Clc2 causes an image with a low gray level to be displayed. At this time, the decreased electric charge in the second pixel capacitor Clc2 is changed depending on the capacitance of the charge-down capacitor Cdown. Further, the electric charge escaping from the second pixel capacitor Clc2 increases the electric charge on the extension electrode portion 162 that is one of the electrode terminals of the charge-up capacitor Cup. The charge-up capacitor Cup increases the electric charge in the first pixel electrode 170a by the amount of electric charge on the extension electrode portion 162, due to a coupling phenomenon. The first pixel electrode 170a and the extension electrode portion 162 are electrode terminals of the charge-up capacitor Cup. Thus, since the electric charge in the first pixel capacitor Clc1 is increased, the first pixel capacitor Clc1 is charged to a level corresponding to the high gray level signal. Accordingly, the first pixel capacitor Clc1 leads to display of an image with a high gray level.

Subsequently, the supply of the gate turn-on voltage applied to the second gate line 110b is cut off, and a gate turn-off voltage is applied to the second gate line 110b. Accordingly, the third TFT 120c is turned off. The first pixel capacitor Clc1 is maintained in a state where it is charged with the increased electric charge, which is increased from the electric charge corresponding to the initial gray level signal and corresponds to the high gray level signal. The second pixel capacitor Clc2 is maintained in a state where it is charged with the decreased electric charge, which is decreased from the electric charge corresponding to the initial gray level signal and corresponds to the low gray level signal.

According to this exemplary embodiment, both images with high and low gray levels can be implemented.

The difference between the high and low gray levels can be adjusted by controlling the capacitances of the charge-up and charge-down capacitors Cdown and Cup. Thus, it is preferred that the capacitances of the charge-up and charge-down capacitors Cdown and Cup be maintained constant in order to accurately express the gray levels. However, the capacitances of the charge-up and charge-down capacitors Cdown and Cup are greatly changed due to the alignment error generated in a manufacturing process as compared with the initially set reference value. Accordingly, in this exemplary embodiment, the shapes of the electrodes of the charge-up and charge-down capacitors Cdown and Cup are modified so that the changes in the capacitances of the charge-up and charge-down capacitors Cdown and Cup due to the alignment error are minimized.

Hereinafter, a method of manufacturing a TFT substrate for a display having the aforementioned structure and effects according to an exemplary embodiment of the present invention will be described.

FIGS. 8A, 8B, 9A, 9B, 10A, and 10B are views illustrating the process of manufacturing a TFT substrate according to the first exemplary embodiment of the present invention.

Figure 8A:
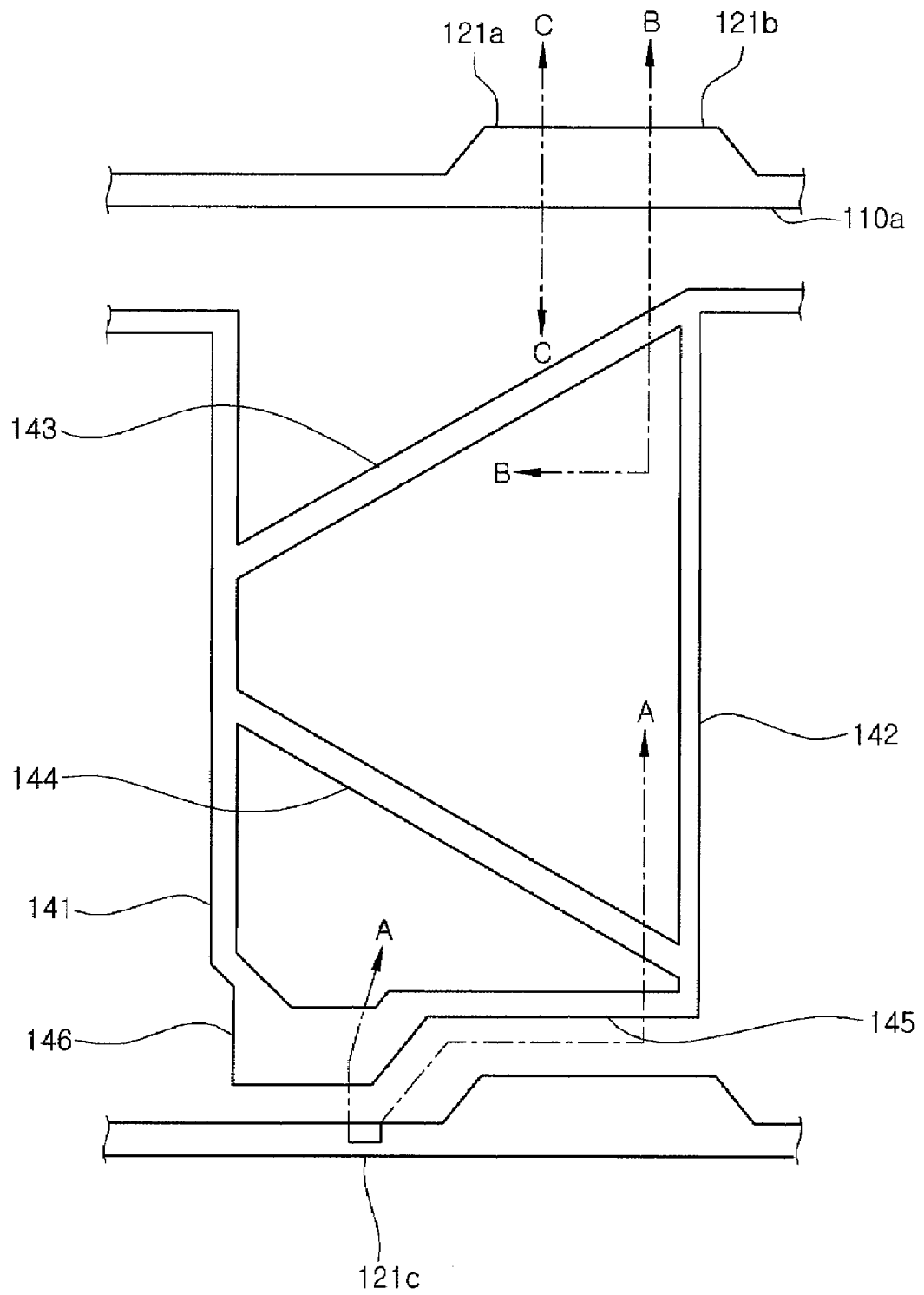
FIGS. 8A, 8B, 9A, 9B, and 10A and 10B are views illustrating a process of manufacturing a thin film transistor (TFT) substrate according to the first exemplary embodiment of the present invention.
Figure 8B:
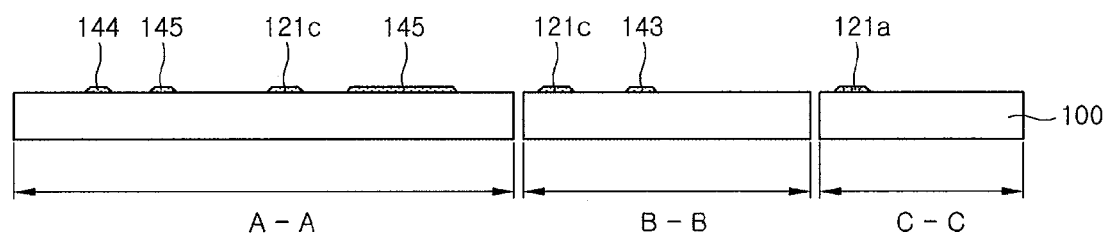

Referring to FIGS. 8A and 8B, a first conductive film is formed on a transparent insulative substrate 100 and then patterned to form gate lines 110 (110a and 110b), first to third gate terminals 121a, 121b and 121c, and a storage electrode portion 140 (141, 142, 143, 144, 145 and 146).

Preferably, at least any one of Cr, MoW, Cr/Al, Cu, Al(Nd), Mo/Al, Mo/Al(Nd), Cr/Al(Nd) and Mo/Al/Mo is used as the first conductive film. However, the first conductive film is not limited to having only the compositions described herein. The first conductive film may be made of at least any one metal of Al, Nd, Ag, Cr, Ti, Ta and Mo, or an alloy thereof, and formed to have a single- or multiple-layered structure. That is, the first conductive film may have a double- or triple-layer structure including a metal layer with a superior physical-chemical property and an Al or Ag based metal layer with a low specific resistance. After the aforementioned first conductive film is formed on the entire substrate 100, photoresist is applied thereon and a photoresist mask pattern is then formed by performing a lithography process using a mask. As shown in FIGS. 8A and 8B, an etching process is performed using the photoresist mask pattern as an etching mask to form the first and second gate lines 110a and 110b. The first and second gate terminals 121a and 121b are formed at the first gate line 110a, and the third gate terminal 121c is formed at the second gate line 110b. Further, the storage electrode portion 140 having first to fifth storage lines 141, 142, 143, 144 and 145 and a storage electrode overlapping portion 146 is formed on the substrate 100. Subsequently, the photoresist mask pattern is removed by performing a predetermined stripping process.

Figure 9A:
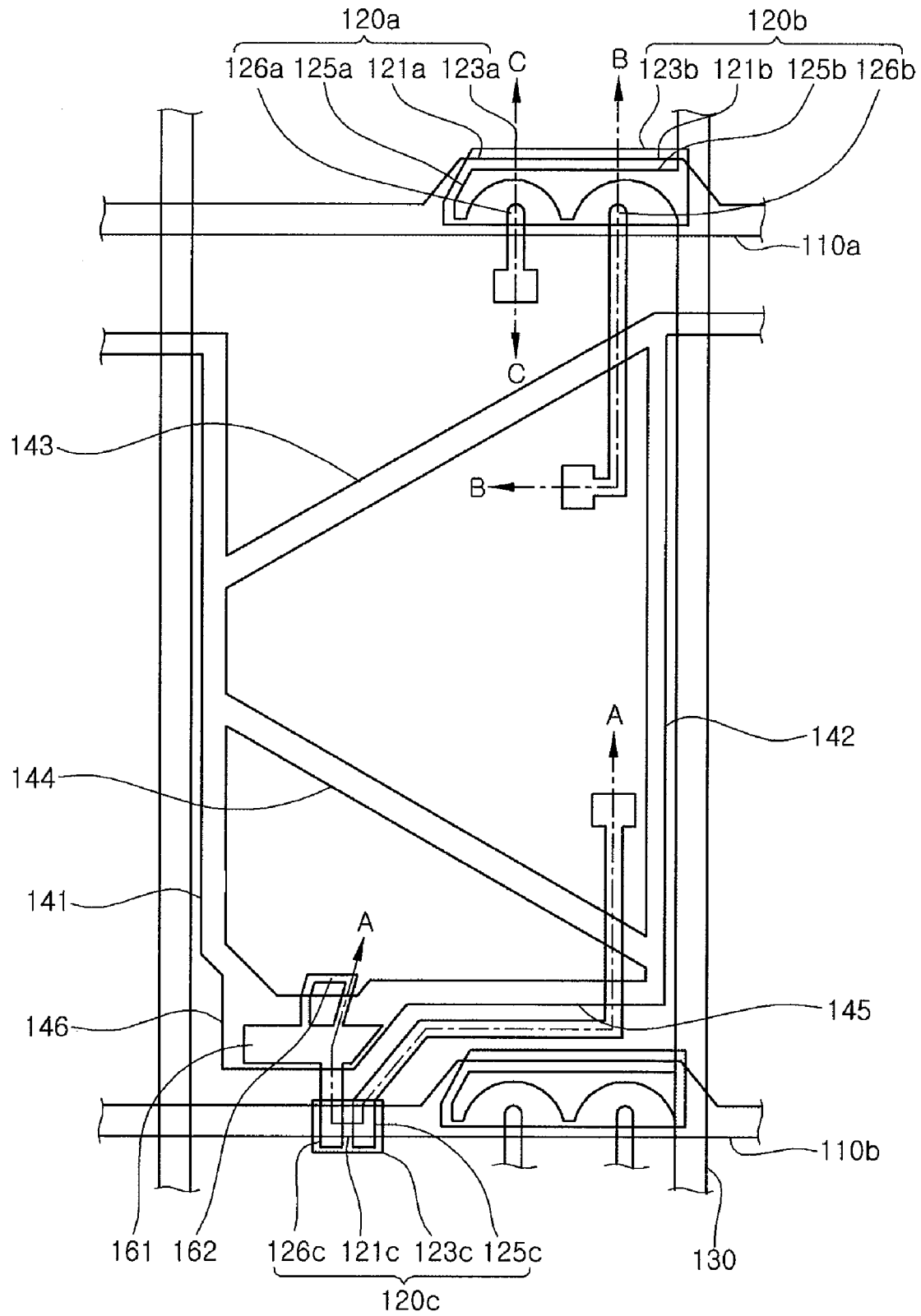
Figure 9B:
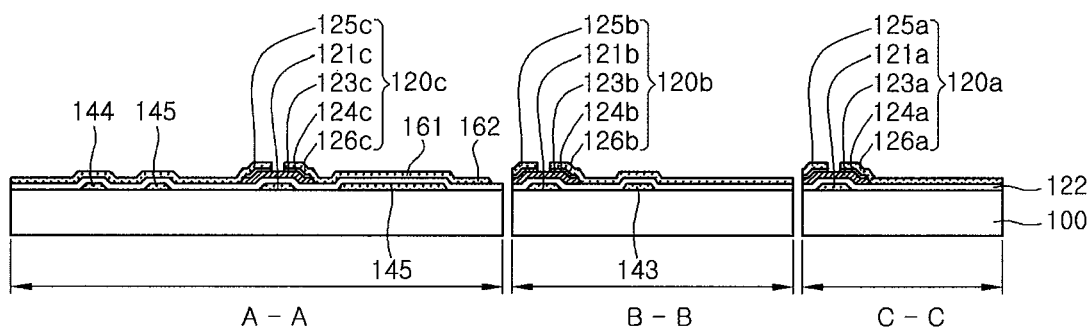

Referring to FIGS. 9A and 9B, a gate insulation film 122 and thin films for active and ohmic contact layers are sequentially formed on the substrate with the gate lines 110 formed thereon. Then, the thin films for active and ohmic contact layers are patterned to form active regions of the first to third TFTs 120a, 120b and 120c having first to third active layers 123a, 123b and 123c and first to third ohmic contact layers 124a, 124b and 124c.

Preferably, an inorganic insulation material including silicon nitride or oxide is used as the gate insulation film 122. An amorphous silicone layer is used as the thin film for the active layers, and an amorphous silicone layer doped with highly concentrated silicide or N-type impurities is used as the thin film for the ohmic contact layers.

Subsequently, a second conductive film is formed on the entire structure with the active regions of the first to third TFTs 120a, 120b and 120c formed thereon, and then patterned to form data lines 130, first to third source terminals 125a, 125b and 125c, first to third drain terminals 126a, 126b and 126c, an overlapping electrode portion 161 connected to the third drain terminal 126c, and an extension electrode portion 162 connected to the overlapping electrode portion 161.

The second conductive film preferably has a single- or multiple-layered structure made of at least one metal of Mo, Al, Cr and Ti. It will be apparent that the same material as the first conductive film may be used to form the second conductive film. Photoresist is applied on the second conductive film, and a photoresist mask pattern is then formed by performing a lithography process using a mask. The second conductive film is etched by performing an etching process using the photoresist mask pattern as an etching mask to form the data lines 130 perpendicular to the gate lines 110. The first to third source terminals 125a, 125b and 125c and first to third drain terminals 126a, 126b and 126c are formed on top of the first to third gate terminals 121a, 121b and 121c, respectively. The ohmic contact layers 124a, 124b, 124c respectively exposed between the source terminals 125a, 125b, 125c and the drain terminals 126a, 126b, 126c, are removed through an etching process to form the first to third TFTs 120a, 120b, 120c. The first to third TFTs 120a, 120b, 120c respectively have channels formed of the active layers 123a, 123b, 123c between the source terminals 125a, 125b, 125c and the drain terminals 126a, 126b, 126c.

The overlapping electrode portion 161 is connected to the third drain terminal 126c, and at least a portion of the overlapping electrode portion 161 is provided on top of the storage electrode overlapping portion 146. Further, the storage electrode portion 162 is connected to the overlapping electrode portion 161 to have an electrode connection region in the shape of a band extending to a region in which a first pixel electrode 170a will be formed.

Figure 10A:
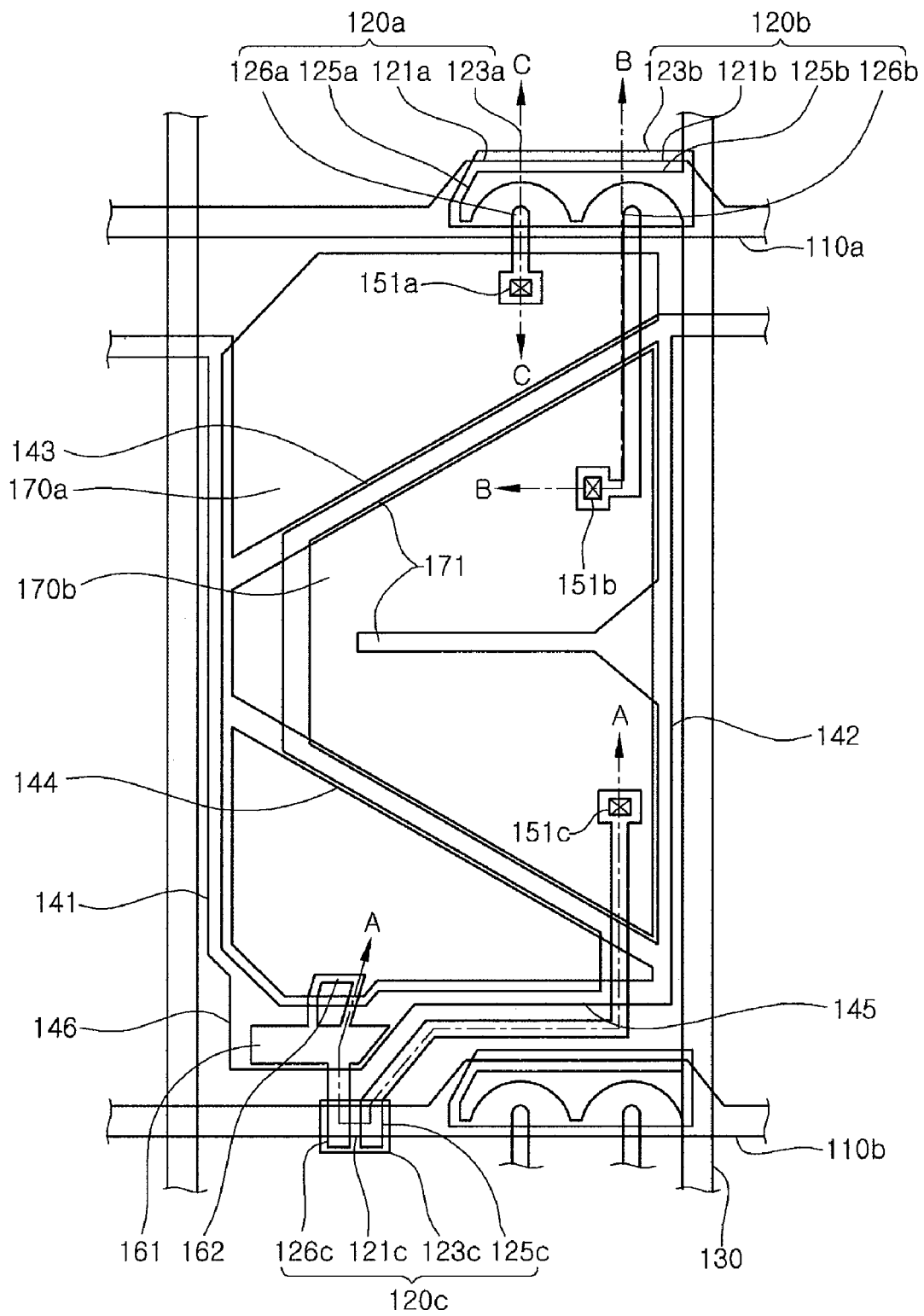
Figure 10B:
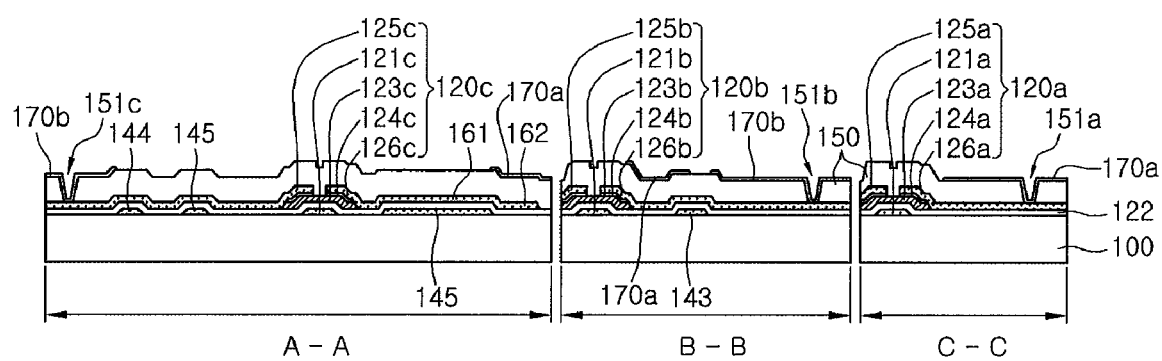

Referring to FIGS. 10A and 10B, a protection film 150 is formed on the substrate 100 having the first to third TFTs 120a, 120b and 120c formed thereon. The protection film 150 is partially removed through an etching process using a photoresist mask pattern to form first and second pixel contact holes 151a and 151b, respectively exposing portions of the first and second drain terminals 126a and 126b of the first and second TFTs 120a and 120b, and a third pixel contact hole 151c exposing a portion of the third source terminal 125c of the third TFT 120c.

A third conductive film is formed on the protection film 150 having the first to third pixel contact holes 151a, 151b and 151c formed therein. The third conductive film is patterned using a photoresist mask pattern (not shown) to form the first and second pixel electrodes 170a and 170b having cut-away patterns 171 provided therein. Here, it is preferred that a transparent conductive film including indium tin oxide (ITO) or indium zinc oxide (IZO) is used as the third conductive film. The first pixel electrode 170a is connected to the first drain terminal 126a through the first pixel contact hole 151a. Further, a portion of the first pixel electrode 170a extends to an upper region of the extension electrode portion 162 of the third drain terminal 126c. The second pixel electrode 170b is connected to the second drain terminal 126b through the second pixel contact hole 151b and connected to the third source terminal 125c through the third pixel contact hole 151c.

Through the aforementioned processes, there are provided two sub-pixels having the first and second pixel electrodes 170a and 170b insulated electrically from each other in a unit pixel region defined by the gate and data lines 110 and 130.

The first and second pixel electrodes 170a and 170b are formed as describe above, and a first orientation film (not shown) is then formed on the entire structure. Accordingly, a lower substrate, i.e., a TFT substrate, is manufactured.

Meanwhile, a common electrode substrate is manufactured by sequentially forming a black matrix, color filters, an overcoat film, protrusion patterns, a common electrode and a second orientation layer (not shown) on a transparent insulative substrate. Thereafter, spacers (not shown) are interposed between the TFT substrate and the common electrode substrate, which are manufactured as described above, and the substrates are bonded to each other. Subsequently, a liquid crystal layer is formed by injecting liquid crystals into a predetermined space between the substrates defined by the spacers through a vacuum injection method, thereby manufacturing the LCD according to this exemplary embodiment.

Although the TFT substrate of the aforementioned exemplary embodiment is manufactured through a process using five sheets of masks, the present invention is not limited thereto. That is, the TFT substrate may be formed through a process using more or less than five sheets of masks.

The present invention is not limited to the aforementioned descriptions. That is, there may be provided a cut-away region, in which a region of the first pixel electrode connected to the extension portion of the third drain terminal is cut away. Accordingly, any change in the overlapping area between the extension portion and the first pixel electrode due to the alignment error generated in the processes can be minimized. Hereinafter, a TFT substrate according to a second exemplary embodiment of the present invention will be described with reference to the accompanying drawings. Descriptions overlapping with the aforementioned exemplary embodiment will be omitted. The descriptions of the second exemplary embodiment can be applied to the first exemplary embodiment.

Figure 11:
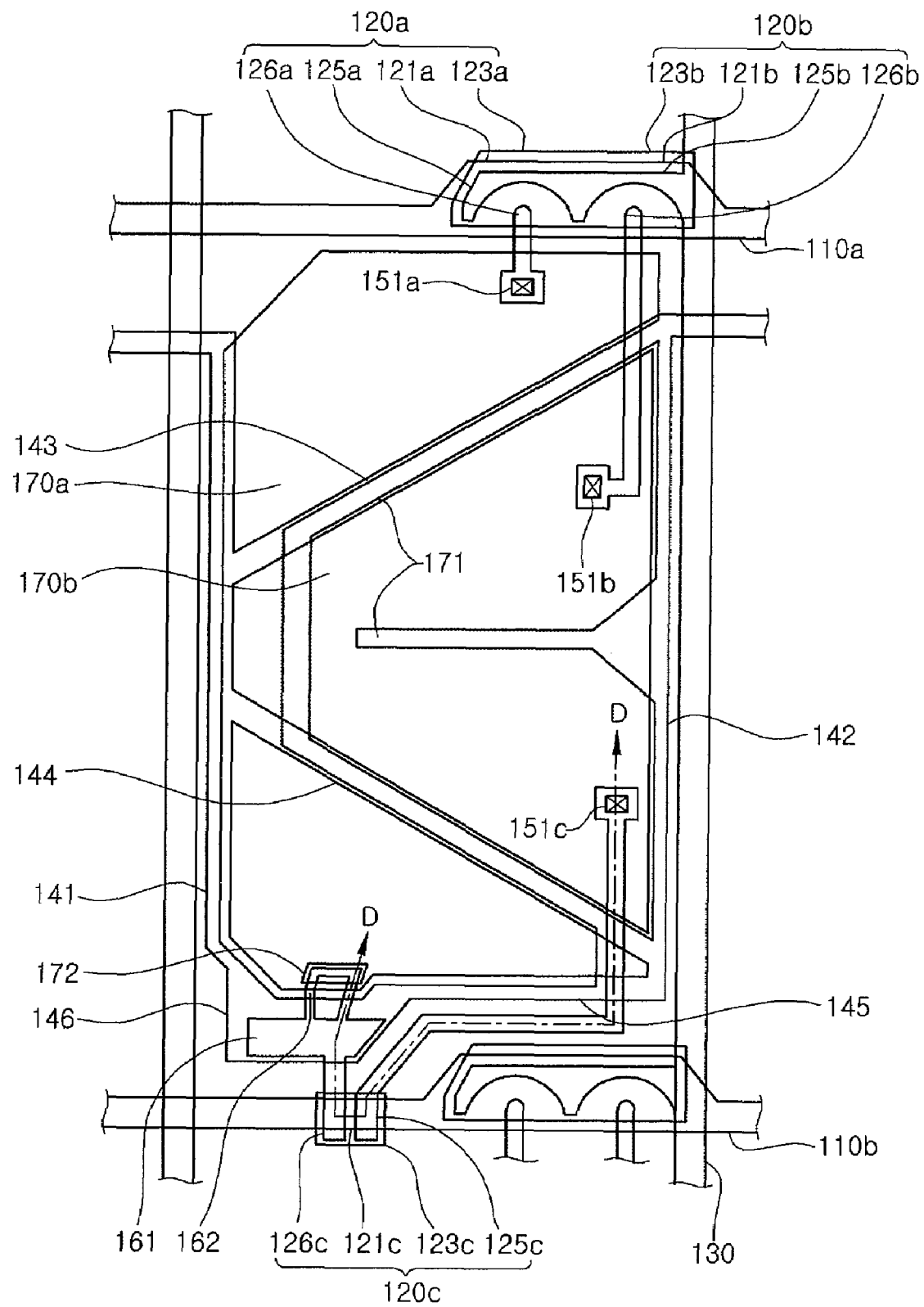
FIG. 11 is a plan view conceptually showing a TFT substrate according to a second exemplary embodiment of the present invention.
Figure 12:
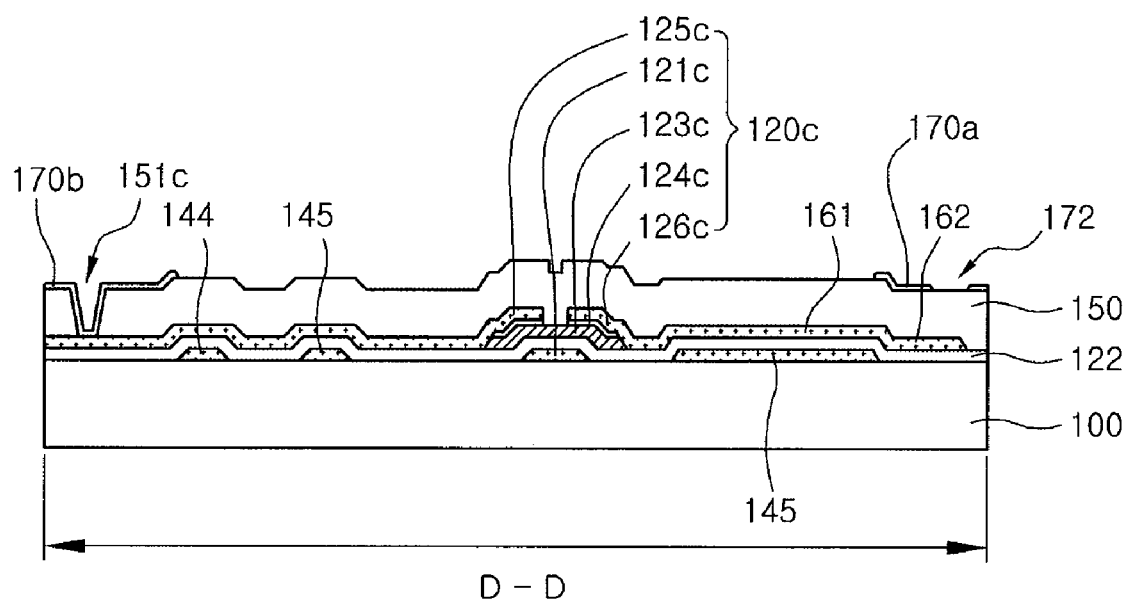
FIG. 12 is a sectional view taken along line D-D in FIG. 11.

FIG. 11 is a plan view conceptually showing the TFT substrate according to the second exemplary embodiment of the present invention, and FIG. 12 is a sectional view taken along the line D-D in FIG. 11.

Referring to FIGS. 11 and 12, the TFT substrate according to this exemplary embodiment comprises first and second pixel electrodes 170a and 170b, first and second TFTs 120a and 120b respectively connected to the first and second pixel electrodes 170a and 170b, a storage electrode portion 140 (141, 142, 143, 144, 145 and 146) partially overlapping the first and second pixel electrodes 170a and 170b, an overlapping electrode portion 161 partially overlapping the storage electrode portion 140, an extension electrode portion 162 connected to the overlapping electrode portion 161 to partially overlap the first pixel electrode 170a, and a third TFT 120c connected to the overlapping electrode portion 161 and the second pixel electrode 170b.

The first pixel electrode 170a includes at least one cut-away region 172 provided in the region in which the first pixel electrode 170a overlaps the extension electrode portion 162. The cut-away region 172 is a region in which a portion of the first pixel electrode 170a is removed. A portion of the extension electrode portion 162 is positioned in the cut-away region 172. The overlapping region between the first pixel electrode 170a and the extension electrode portion 162 can be controlled and the capacitance of a charge-up capacitor can be adjusted in accordance with the area of the extension electrode portion 162 positioned in the cut-away region 172.

The aforementioned cut-away region 172 causes a region of the first pixel electrode 170a to be formed in the shape of a frame. Thus, the frame-shaped extension electrode portion 162 and the frame-shaped first pixel electrode 170a overlap each other, and a charge-up capacitor is formed in the region in which the extension electrode portion 162 and the first pixel electrode 170a overlap each other. Accordingly, even if the position of the first pixel electrode 170a is changed due to the alignment error generated during the formation of the first pixel electrode 170a, the increment in the area of the region in which the frame-shaped extension electrode portion 162 and the frame-shaped first pixel electrode 170a overlap each other may be smaller than that of the region in which the plate-shaped extension electrode portion 162 and the plate-shaped first pixel electrode 170a overlap. Further, the area of the region in which the extension electrode portion 162 and the first pixel electrode 170a overlap each other may not be increased due to the overlapping of the frame shapes. Accordingly, even if there occurs an alignment error between the first pixel electrode 170a and the extension electrode portion 162, the change in the overlapping area can be minimized so that the capacitance of the charge-up capacitor can be prevented from being rapidly increased or decreased.

As described above, the present invention has a charge-up capacitor increasing electric charge in a first pixel capacitor and a charge-down capacitor decreasing electric charge in a second pixel capacitor, so that an image with a high gray level can be displayed using the first pixel capacitor and an image with a low gray level can be displayed using the second pixel capacitor.

Further, according to the present invention, an extension electrode portion of the charge-up capacitor is formed in the shape of a frame. This way, any variation in the overlapping area between the first pixel electrode and the extension electrode can be reduced.

Furthermore, according to the present invention, a cut-away region is provided in the first pixel electrode overlapping the extension electrode portion. This way, any variation in the overlapping area between the first pixel electrode and the extension electrode portion can be further reduced.

Although the present invention has been described in connection with the accompanying drawings and the preferred exemplary embodiments, the present invention is not limited thereto but defined by the appended claims. Accordingly, it will be understood by those skilled in the art that various modifications and changes can be made thereto without departing from the spirit and scope of the invention as defined by the appended claims.

What is claimed is:

1. A thin film transistor (TFT) substrate comprising:
    a plurality of gate lines and a plurality of data lines intersecting the plurality of gate lines;
    first and second pixel electrodes provided in a unit pixel region defined by the gate and data lines;
    a storage electrode partially overlapping the first and second pixel electrodes;
    an overlapping electrode portion at least partially overlapping the storage electrode portion;
    an extension electrode portion including at least one electrode overlapping region overlapping the first pixel electrode and at least one electrode connection region for connecting the electrode overlapping region and the overlapping electrode portion;
    first and second TFTs having source terminals connected to the data line and drain terminals respectively connected to the first and second pixel electrode; and
    a third TFT having a source terminal connected to the second pixel electrode and a drain terminal connected to the overlapping electrode portion.

2. The TFT substrate of claim 1, wherein the electrode connection region of the extension electrode portion is formed in the shape of a frame.

3. The TFT substrate of claim 1, wherein the electrode overlapping region is formed in the shape of a frame or plate.

4. The TFT substrate of claim 1, wherein the electrode connection region and electrode overlapping region of the extension electrode portion is formed in the shape of a single frame, and at least one end of the band is connected to the overlapping electrode portion.

5. The TFT substrate of claim 1, wherein the storage electrode portion comprises a storage electrode overlapping portion extending in the shape of a plate in one edge of the unit pixel region, and the overlapping electrode portion overlaps the storage electrode overlapping portion.

6. The TFT substrate of claim 1, further comprising a cut-away region provided in a region of the first pixel electrode overlapping the extension electrode portion.

7. The TFT substrate of claim 1, wherein the gate lines comprise a first gate line and a second gate line, gate terminals of the respective first and second TFTs are connected to the first gate line, and a gate terminal of the third TFT is connected to the second gate line.

8. A TFT substrate comprising:
    a plurality of gate lines and a plurality of data lines intersecting the plurality of gate lines;
    first and second pixel electrodes provided in a unit pixel region defined by the gate and data lines;
    a storage electrode partially overlapping the first and second pixel electrodes;
    an overlapping electrode portion at least partially overlapping the storage electrode portion;
    an extension electrode portion connected to the overlapping electrode portion and partially overlapping the first pixel electrode;
    first and second TFTs having source terminals connected to the data line and drain terminals respectively connected to the first and second pixel electrode;
    a third TFT having a source terminal connected to the second pixel electrode and a drain terminal connected to the overlapping electrode portion; and at least one cut-away region provided in a region of the first pixel electrode overlapping the extension electrode portion.

9. The TFT substrate of claim 8, wherein the extension electrode portion comprises at least one electrode overlapping region overlapping with the first pixel electrode and at least one frame-shaped electrode connection region for connecting the electrode overlapping region and the overlapping electrode portion.

10. The TFT substrate of claim 9, wherein the electrode overlapping region is formed in the shape of a frame or plate.

11. The TFT substrate of claim 8, wherein the extension electrode portion is formed in the shape of a frame, and at least one end of the frame is connected to the overlapping electrode portion.

12. The TFT substrate of claim 8, wherein the gate lines comprise a first gate line and a second gate line, gate terminals of the respective first and second TFTs are connected to the first gate line, and a gate terminal of the third TFT is connected to the second gate line.

* * * * *